United States Patent
Chen

(10) Patent No.: US 12,497,505 B2
(45) Date of Patent: Dec. 16, 2025

(54) ONE COMPONENT (1K) COMPOSITION BASED ON MODIFIED EPOXY RESIN

(71) Applicant: Henkel AG & Co KGaA, Duesseldorf (DE)

(72) Inventor: Chunfu Chen, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 757 days.

(21) Appl. No.: 17/705,953

(22) Filed: Mar. 28, 2022

(65) Prior Publication Data

US 2022/0213313 A1 Jul. 7, 2022

Related U.S. Application Data

(63) Continuation of application No. PCT/EP2020/076477, filed on Sep. 23, 2020.

(30) Foreign Application Priority Data

Sep. 27, 2019 (EP) .................................. 19200026

(51) Int. Cl.
*C08L 63/00* (2006.01)
*C09J 163/00* (2006.01)

(52) U.S. Cl.
CPC ............. *C08L 63/00* (2013.01); *C09J 163/00* (2013.01)

(58) Field of Classification Search
CPC combination set(s) only.
See application file for complete search history.

(56) References Cited

U.S. PATENT DOCUMENTS

| | | |
|---|---|---|
| 8,541,512 B2 | 9/2013 | Schoenfeld et al. |
| 9,394,468 B2 | 7/2016 | Czaplicki et al. |
| 2012/0128987 A1 | 5/2012 | Schoenfeld et al. |
| 2012/0279697 A1 | 11/2012 | Forray et al. |
| 2014/0113983 A1* | 4/2014 | Czaplicki ............... C09J 181/04 521/95 |
| 2017/0107409 A1* | 4/2017 | Harrington ............. C08G 59/68 |
| 2017/0321094 A1* | 11/2017 | Holtgrewe ............... C09J 11/08 |

FOREIGN PATENT DOCUMENTS

| | | |
|---|---|---|
| CN | 101287794 A | 10/2008 |
| CN | 103797043 A | 5/2014 |
| JP | S53120532 A | 10/1978 |
| JP | 2013500371 A | 1/2013 |
| JP | 2013510926 A | 3/2013 |
| JP | 2016199739 A | 12/2016 |
| WO | 2007025007 A1 | 3/2007 |
| WO | 2011059942 A2 | 5/2011 |
| WO | 2013070415 A1 | 5/2013 |
| WO | 2018080747 | 5/2018 |
| WO | WO-2018080747 A1 * | 5/2018 ............. C08G 59/06 |

OTHER PUBLICATIONS

AlzChem Dyhard 100S Data Sheet, May 2007, AlzChem GmbH.*
Adeka Epoxy Resins, https://www.adeka.co.jp/en/chemical/products/functional/pro142c.html, accessed Apr. 15, 2025, p. 5.*
PCT International Search Report issued in connection with International Application No. PCT/EP2020/076477—Mailing date: Oct. 9, 2020.

* cited by examiner

*Primary Examiner* — Anthony J Frost
(74) *Attorney, Agent, or Firm* — Steven C. Bauman

(57) ABSTRACT

The present invention is directed to an one component (1K) composition comprising:
  a) at least one epoxy resin;
  b) at least one internally flexibilized epoxy resin which is characterized by a Shore D hardness, as measured with a durometer in accordance with ASTM D2240, of ≤45 when cured with diethylene triamine;
  c) core shell rubber particles;
  d) a curative which consists of at least one compound possessing at least two epoxide reactive groups per molecule, said curative being characterized by comprising dicyandiamide; and,
  e) at least one accelerator.

The one component composition finds particular utility as a structural adhesive.

16 Claims, No Drawings

ONE COMPONENT (1K) COMPOSITION BASED ON MODIFIED EPOXY RESIN

FIELD OF THE INVENTION

The present invention is directed to one component (1K) compositions based on modified epoxy resins. More particularly, the present invention is directed to one component compositions comprising an epoxy resin, at least one modified epoxy resin and a curative comprising dicyandiamide.

BACKGROUND OF THE INVENTION

Epoxy resins have found a broad range of application, predominantly on the basis that a particular selection of resin, modifier and cross-linking agent (or curative) can allow the properties of the cured epoxy resin to be tailored to achieve specific performance characteristics.

That versatility being acknowledged, properly cured epoxy resins also possess a plurality of other attributes including inter alia: excellent chemical resistance, particularly to alkaline environments; high tensile and compressive strengths; high fatigue strength; low shrinkage upon cure; and, electrical insulation properties and retention thereof upon aging or environmental exposure.

These attributes have enabled the use of epoxy resins as structural adhesives which are intended to bond materials with a mechanical strength comparable to mechanical fasteners: structural adhesives may be used to replace or augment conventional joining techniques—such as welding, which often cannot be performed on dissimilar materials, polymers or polymer composites—or to replace or augment mechanical fasteners, such as nuts and bolts, screws and rivets.

In such utility, the epoxy based adhesives are often required to bond surfaces which are inclined, vertical or otherwise shaped, of which examples include weld seams and weld flanges in automotive vehicles, and hem flanges. This imposes requirements on the workability of epoxy based compositions and on the ability of the epoxy based compositions to wet the surfaces to which they are applied. The thixotropic properties of the composition under inter alia the temperature, pressure, moisture and shear conditions both during application and during the curing process can also be determinative of the utility of the composition in bonding particular materials.

The present inventors consider that a need exists for controlled curing, adhesive compositions suitable for use in structural bonding applications, which can advantageously replace the known compositions and can obviate the need to use additional supporting fixtures during the adhesive bonding operations.

STATEMENT OF THE INVENTION

In accordance with a first aspect of the present invention there is provided an one component (1K) composition comprising:
a) at least one epoxy resin;
b) at least one internally flexibilized epoxy resin which is characterized by a Shore D hardness, as measured with a durometer in accordance with ASTM D2240, of ≤45 when cured with diethylene triamine;
c) core shell rubber particles;
d) a curative which consists of at least one compound possessing at least two epoxide reactive groups per molecule, said curative being characterized by comprising dicyandiamide; and,
e) at least one accelerator.

In certain important embodiments, the one component composition may further comprise: at least one chelate modified epoxy resin; and/or, at least one elastomer modified epoxy resin.

The internally flexibilized epoxy resin of the composition should preferably have an epoxide equivalent weight of from 200 to 600 g/eq. Independently of or additional to that consideration, said internally flexibilized epoxy resin should be characterized by a Shore D hardness, as measured with a durometer in accordance with ASTM D2240, of ≤40 when cured with diethylene triamine.

It is desired that the dicyandiamide of the present invention has a particulate form characterized by an average particle size (d50) of from 0.5 to 100 μm, as measured by dynamic light scattering. Independently of or additional to that consideration, it is preferred that e) said at least one accelerator comprises or consists of at least one urea derivative of Formula (V) or Formula (VI):

Formula (V)

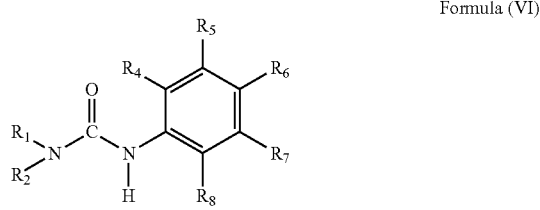

Formula (VI)

wherein: at least one residue $R^1$, $R^2$, $R^3$ is not hydrogen;
$R^1$ and $R^2$ are independently selected from hydrogen, $C_1$-$C_{18}$ alkyl and $C_3$-$C_{18}$ cycloalkyl;
$R^3$ is hydrogen, $C_1$-$C_{18}$ alkyl, $C_3$-$C_{18}$ cycloalkyl, $C_6$-$C_{18}$ aryl, $C_6$-$C_{18}$ aralkyl, $C_6$-$C_{18}$-alkylaryl, $C_1$-$C_{18}$ alkyl substituted with —NHC(O)NR$^1$R$^2$, $C_3$-$C_{18}$ cycloalkyl substituted with —NHC(O)NR$^1$R$^2$, $C_6$-$C_{18}$ aryl substituted with —NHC(O)NR$^1$R$^2$; $C_6$-$C_{18}$ aralkyl substituted with —NHC(O)NR$^1$R$^2$; and, $C_6$-$C_{18}$ aralkyl substituted with —NHC(O)NR$^1$R$^2$; and,
$R^4$, $R^5$, $R^6$, $R^7$ and $R^8$ are independently selected from hydrogen, halogen, $C_1$-$C_{18}$ alkyl, $C_3$ to $C_{18}$ cycloalkyl, $C_6$-$C_{18}$ aryl, $C_6$-$C_{18}$ aralkyl, $C_6$-$C_{18}$-alkylaryl, —CF$_3$, —NHC(O)NR$^1$R$^2$, $C_1$-$C_{18}$ alkyl substituted with —NHC(O)NR$^1$R$^2$, $C_3$-$C_{18}$ cycloalkyl substituted with —NHC(O)NR$^1$R$^2$, $C_6$-$C_{18}$ aryl substituted with —NHC(O)NR$^1$R$^2$; $C_6$-$C_{18}$ aralkyl substituted with —NHC(O)NR$^1$R$^2$; and, $C_6$-$C_{18}$ aralkyl substituted with —NHC(O)NR$^1$R$^2$.

A particular preference may be noted for the use of at least one urea derivative selected from the group consisting of N,N-diethylurea, N,N-dipropylurea, N,N-ethyl-methylurea, N,N-dimethylurea, 1,1'-(4-methyl-m-phenylene)-bis-(3,3-dimethylurea) and 1,1'-(2-methyl-m-phenylene)-bis-(3,3-dimethylurea).

Where the accelerator of the composition comprises or consists of the above described urea derivatives, it is preferable that the molar ratio of dicyandiamide to the total of said urea derivatives is in the range from 1:1 to 4:1.

In accordance with a second aspect of the invention, there is provided a cured product obtained from the one component (1K) composition as defined herein above and in the appended claims.

A further aspect of the invention provides for the use of the cured reaction product as defined herein above and in the appended claims as a structural adhesive.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

As used herein, the term "consisting essentially of" limits the scope of a claim to the specified element, ingredient, member or method step and those supplementary elements, ingredients, members or methods steps which do not materially affect the basic and novel characteristic(s) of the claimed invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0" specifically includes 0 wt. %: the ingredient defined by said range may or may not be present in the composition.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

As used herein, the term "equivalent (eq.)" relates, as is usual in chemical notation, to the relative number of reactive groups present in the reaction.

The term "equivalent weight" as used herein refers to the molecular weight divided by the number of a function concerned. As such, "epoxy equivalent weight" (EEW) means the weight of resin, in grams, that contains one equivalent of epoxy. Equally, the "amine hydrogen equivalent weight" (AHEW) is the weight of the organic amine, in grams, that contains one amine hydrogen.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

The term "internal flexibilization" as applied herein refers to the chemical modification of the epoxy backbone: this is conventionally effected by the incorporation of aliphatic components—preferably alkylene, oxyalkylene or polyester units or C=C bonds—into the epoxy backbone. Double carbon-carbon bonds, for instance, increase flexibility by enhancing the rotation of adjacent single carbon-carbon bonds. That aside, said flexibilized epoxy resins have a Shore D hardness—as measured with a durometer in accordance with ASTM D2240—of ≤45, preferably ≤40 when cured with diethylene triamine (DETA). And instructive references for the preparation of internally flexibilized resins meeting this hardness condition and which are useful in the present invention include, for example: U.S. Pat. No. 3,522, 210 (Sellers et al.); U.S. Pat. No. 4,883,830 (Kitabatake et al.); and, U.S. Pat. No. 4,793,703 (Fretz).

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. Important substituents—such as urea for the described accelerators—may be mentioned independently in the description. Also, the halogenated derivatives of the exemplary hydrocarbon radicals listed above might, in particular, be mentioned as examples of suitable substituted alkyl groups. In general, however, a preference for unsubstituted alkyl groups containing from 1-18 carbon atoms ($C_1$-$C_{18}$ alkyl)—for example unsubstituted alkyl groups containing from 1 to 12 carbon atoms ($C_1$-$C_{12}$ alkyl) or from 1 to 6 carbon atoms ($C_1$-$C_6$ alkyl)—should be noted.

The term "$C_3$-$C_{30}$ cycloalkyl" is understood to mean a saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —CH=$CHCH_3$; —$CH_2$CH=$CH_2$; —C(=$CH_2$)($CH_3$); —CH=$CHCH_2CH_3$; —$CH_2$CH=$CHCH_3$; —$CH_2CH_2$CH=$CH_2$; —CH=C($CH_3$)$_2$; —$CH_2$C(=$CH_2$)($CH_3$); —C(=$CH_2$)$CH_2CH_3$; —C($CH_3$)=$CHCH_3$; —C($CH_3$)CH=$CH_2$; —CH=$CHCH_2CH_2CH_3$; —$CH_2$CH=$CHCH_2CH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=CH; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above. Further, as used herein "aralkyl" means an alkyl group substituted with an aryl radical as defined above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

As used herein, the term "catalytic amount" means a sub-stoichiometric amount of catalyst relative to a reactant, except where expressly stated otherwise.

The term "accelerator" as used herein refers to a chemical agent that is co-reactive with the curative and which reduces the cure time of the composition relative to that achievable with said curative alone under equivalent conditions.

As employed herein a "primary amino group" refers to an $NH_2$ group that is attached to an organic radical, and a "secondary amino group" refers to an NH group that is attached to two organic radicals, which may also together be part of a ring. Where used, the term "amine hydrogen" refers to the hydrogen atoms of primary and secondary amino groups.

Where "amine number" is mentioned herein, this is determinable by titration of the amine acetate ion by a dilute, typically 1N HCl solution. For a pure material, the amine number can be calculated using the molecular weights of the pure compound and KOH (56.1 g/mol). Instructive guidance may be found, for illustration, in https://dowac.custhelp.com/app/answers/detail/a_id/12987.

The term "photoinitiator" as used herein denotes a compound which can be activated by an energy-carrying activation beam—such as electromagnetic radiation—for instance upon irradiation therewith. The term is intended to encompass both photoacid generators and photobase generators. Specifically, the term "photoacid generator" refers to a compound or polymer which generates an acid for the catalysis of the acid hardening resin system upon exposure to actinic radiation. The term "photobase generator" means any material which when exposed to suitable radiation generates one or more bases.

The term "Lewis acid" used herein denotes any molecule or ion—often referred to as an electrophile—capable of combining with another molecule or ion by forming a covalent bond with two electrons from the second molecule or ion: a Lewis acid is thus an electron acceptor.

The term "polyol" as used herein shall include diols and higher functionality hydroxyl compounds.

The hydroxyl (OH) values given herein are measured according to Japan Industrial Standard (JIS) K-1557, 6.4. The isocyanate content values given herein are measured according to EN ISO 1 1909.

The molecular weights referred to in this specification can be measured with gel permeation chromatography (GPC) using polystyrene calibration standards, such as is done according to ASTM 3536.

As used herein, "anhydrous" means the relevant composition includes less than 0.25% by weight of water. For example the composition may contain less than 0.1% by weight of water or be completely free of water. The term "essentially free of solvent" should be interpreted analogously as meaning the relevant composition comprises less than 0.25% by weight of solvent.

Viscosities of the coating compositions described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

As used herein, "thixotropic index" is defined as a viscosity measurement taken at a spindle speed of 0.5 rpm divided by a viscosity measurement taken at a spindle speed of 5 rpm.

As used herein, the term "lap shear strength" is defined as the shear strength of adhesives for bonding materials when tested on a single-lap-joint specimen. The test is applicable for determining adhesive strengths, surface preparation parameters and adhesive environmental durability. As used herein, lap shear tests were performed by bonding of two aluminum coupons (2.5 cm×10 cm×0.16 cm) via an overlap according to ASTM D1002 10 (2019) Standard Test Method for Apparent Shear Strength of Single-Lap-Joint Adhesively Bonded Metal Specimens by Tension Loading (Metal-to-Metal). Before application of the composition, coupons were rinsed twice with acetone to remove any oils and all ink marks, then chromic acid etched to remove excess surface oxide. Each measurement was conducted at least six times for precision and the results thereof averaged.

DETAILED DESCRIPTION OF THE INVENTION a) Epoxide Compounds

The composition of the present invention should typically comprise epoxy resins a) in an amount of from 20 to 70 wt. %, preferably from 30 to 60 wt. % based on the weight of the composition. For example, the composition of the present invention may contain from 35 to 60 wt. % or from 40 to 60 wt. % of said epoxy resin(s) a), based on the weight of the composition.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and α-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an important embodiment, the monoepoxide compound conforms to Formula (I) herein below:

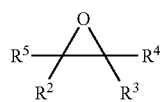

(I)

wherein: $R^2$, $R^3$, $R^4$ and $R^5$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^3$ and $R^4$ is not hydrogen.

It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid $C_1$-$C_{18}$ alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Glycidyl esters of polycarboxylic acids having utility in the present invention are derived from polycarboxylic acids which contain at least two carboxylic acid groups and no other groups reactive with epoxide groups. The polycarboxylic acids can be aliphatic, cycloaliphatic, aromatic and heterocyclic. The preferred polycarboxylic acids are those which contain not more than 18 carbon atoms per carboxylic acid group of which suitable examples include but are not limited to: oxalic acid; sebacic acid; adipic acid; succinic acid; pimelic acid; suberic acid; glutaric acid; dimer and trimer acids of unsaturated fatty acids, such as dimer and trimer acids of linseed fatty acids; phthalic acid; isophthalic acid; terephthalic acid; trimellitic acid; trimesic acid; phenylene-diacetic acid; chlorendic acid; hexahydrophthalic acid, in particular hexahydroorthophthalic acid (1,2-cyclohexanedicarboxylic acid); diphenic acid; naphthalic acid; polyacid terminated esters of di-basic acids and aliphatic polyols; polymers and co-polymers of (meth)acrylic acid; and, crotonic acid.

And examples of highly preferred polyepoxide compounds include: bisphenol-A epoxy resins, such as DER™ 331, DER™ 332, DER™ 383, JER™ 828 and Epotec YD 128; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; brominated epoxy resins such as DER™ 542; castor oil triglycidyl ether, such as ERISYS™ GE-35H; polyglycerol-3-polyglycidyl ether, such as ERISYS™ GE-38; sorbitol glycidyl ether, such as ERISYS™ GE-60; and, bis(2,3-epoxypropyl)cyclohexane-1,2-dicarboxylate, available as Lapox Arch-11.

Whilst it is does not represent a preferred embodiment, the present invention does not preclude the curable compositions further comprising one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the epoxide compounds.

b) Internally Flexibilized Epoxy Resin

The present composition includes at least one internally flexibilized epoxy resin, which resin should desirably have an epoxide equivalent weight of from 200 to 2500 g/eq., for example from 200 to 600 g/eq. Without intention to limit the present invention, it is preferred that the composition contains from 1 to 30 wt. %, preferably from 5 to 30 wt. % and more preferably from 10 to 25 wt. % of said internally flexibilized epoxy resin, based on the weight of the composition.

In a first preferred embodiment, the composition includes an internally flexibilized epoxy resin having the general formula (II):

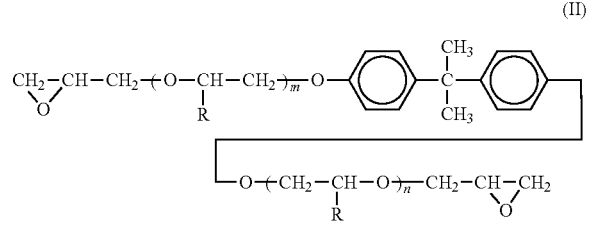

(II)

wherein: R represents a $C_1$-$C_6$ alkyl group or —$CH_2OR'$ wherein R' a $C_1$-$C_{18}$ hydrocarbyl group; and, m and n are independently integers ≥0 but wherein (m+n) is an integer of from 1 to 6, for example from 1 to 3.

Said $C_1$-$C_{18}$ hydrocarbyl group (R') may be an aliphatic, alicyclic, aromatic or aromatic-aliphatic group of which examples include: $C_1$-$C_{10}$, in particular $C_1$-$C_6$ alkyl groups; $C_2$-$C_4$ alkenyl groups; $C_5$-$C_7$ cycloalkyl groups; $C_6$-$C_{18}$ aryl groups; and, $C_7$-$C_{10}$ aralkyl groups. It is noted that when R is —$CH_2OR'$, the condition m=n=1 is preferred.

The diepoxide compound represented by formula (II) used in this invention is obtainable by:

i) adding to bisphenol A, a compound represented by the following formula (III)

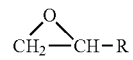

(III)

wherein R is as defined hereinabove; and, ii) epoxidizing the adduct with an epihalohydrin such as epichlorohydrin.

The preferred embodiments of the compound of formula (II) include: 1,2-alkylene oxides, such a 1,2-propylene oxide and 1,2-butylene oxide; alkylglycidylethers, such as isopropylglycidylether, butylglycidylether and 2-ethylhexylglycidylether; alkenylglycidylethers, such as vinylglycidylether and allylglycidylether; cycloalkylglycidylethers, such as cyclopentylglycidylether and cyclohexylglycidylether; and, arylglycidyl ethers such as phenylglycidylether and p-sec-butylglycidylether.

In a second embodiment, the composition includes an internally flexibilized epoxy resin having the general formula (IV):

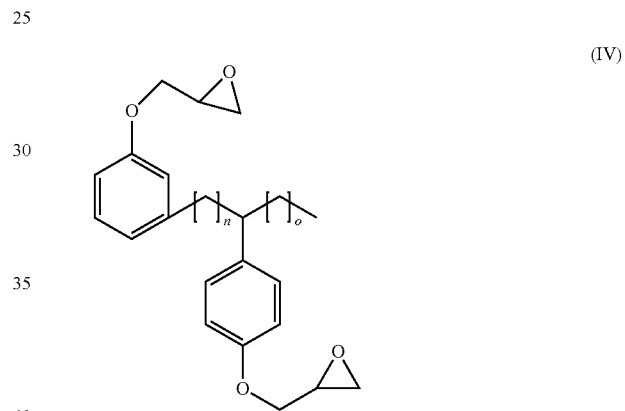

(IV)

wherein n and o are the same or different and are independently selected from 1 to 10. In an embodiment, n and o are independently selected from 2 to 8, for example from 4 to 8.

Representative of commercially available resins suitable for use in the present invention are: DER 732, available from Dow Chemical; Epo-Tek 310A, available from Epoxy Technology; XB-4122, PY-322 and PY-4122US, available from Ciba-Geigy; WC-68, available from Wilmington Chemical; Anthiol R-12, available from Pacific Anchor; and, NC-514 and NC-514S available from Cardiolite.

Optional Further Epoxy Resins: Chelate Modified Epoxy Resin

To help improve adhesion of the cured composition to a substrate surface—especially a metallic substrate surface which has been contaminated with the oily substances commonly encountered in vehicle and other mechanical assembly operations—the present composition may comprise at least one chelate-modified epoxy resin. Said resins, which should desirably have an epoxide equivalent weight of from 150 to 500 g/eq., for example from 150 to 300 g/eq., are the reaction products of epoxy resins and compounds containing chelating functional groups.

The chelating functional groups include those functional groups capable of forming chelate bonds with divalent or polyvalent metal atoms either by themselves or in cooperation with other functional groups positioned on the same molecule. Without intention to limit the present invention, suitable chelating functional groups include: phosphorus-containing acid groups, such as —PO(OH)$_2$; carboxylic acid groups (—CO$_2$H); sulfur-containing acid groups, such as —SO$_3$H; amino groups; and, hydroxyl groups, in particular hydroxyl groups positioned adjacent to each other on aromatic rings.

The preparation of such reaction products may be carried out by methods known in the art. Instructive references in this regard include: U.S. Pat. Nos. 4,702,962; 4,340,716; European Patent No. EP 342 035; Japanese Patent Publications No. P 58-063758; and Japanese Patent Publication No. JP 58-069265.

Reaction products of epoxy resins and compounds containing chelating functional groups are also available from commercial sources such as, for example, the ADEKA Resins EP-49-10N, EP-49-55C, EP-49-10, EP-49-20, EP-49-23, and EP-49-25 available from Asahi Denka.

When present, the composition of the present invention should contain at most 10 wt. %, in particular at most 5 wt. % of said chelate-modified epoxy resins, based on the weight of the composition.

Optional Further Epoxy Resins: Elastomer Modified Epoxy Resin

In certain embodiments, the composition of the present invention may further comprise an elastomer modified epoxy resin. In particular, the composition may be characterized by comprising from 0 to 10 wt. %, for example from 0 to 5 wt. % of elastomer modified epoxy resin, wherein said elastomer modified epoxy resin has an epoxide equivalent weight of from 200 to 2500 g/eq., for example from 200 to 600 g/eq.

Elastomer modification of an epoxy resin (hereinafter denoted E1) may be conducted by any suitable method known to the skilled artisan but it should generally be performed through a catalyzed addition reaction between the functional groups of the modifier (hereinafter denoted M1) and the oxirane groups of the epoxy resin (E1). Such an addition reaction may be conducted in a suitable solvent and under at least one of following conditions: i) a temperature of from 40° C. to 200° C.; ii) a reaction duration of from 0.5 to 5 hours; and, iii) catalysis. Exemplary catalysts include: tertiary amine catalysts, such as tributylamine; quaternary ammonium salts, such as tetrabutylammonium chloride; tertiary phosphates, such as triphenylphosphate; quaternary phosphonium salts, such as ethyltriphenyl phosphonium iodide (ETPPI); metal salts, such as AMC-2 (a chromium octoate salt); and, combinations of these catalysts where staged addition reactions are effected.

The epoxy resin (E1) to be modified has a 1,2-epoxy equivalency of greater than one and preferably of at least 2. The epoxy resin (E1) may be linear or branched, saturated or unsaturated, aliphatic, cycloaliphatic, aromatic or heterocyclic. And as examples of epoxy resins (E1), there may be mentioned: polyglycidyl ethers of polyhydric compounds; brominated epoxies; epoxy novolacs or similar polyhydroxyphenol resins; polyglycidyl ethers of glycols or polyglycols; and, polyglycidyl esters of polycarboxylic acids. A preference may be acknowledged for the use of a polyglycidyl ether of a polyhydric phenol as said epoxy resin (E1).

The functionalized modifier (M1) is functionalized—either terminally or non-terminally—with a group which is reactive to the oxirane group of the epoxy resin (E1). Suitable functional groups include but are not limited to: carboxyl; amino; hydroxyl; epoxy; mercaptan; anhydride; and, isocyanate. In addition, the modifier (M1) may be a functionalized homo-polymer or a functionalized random, block or star co-polymer.

In an important embodiment, the functional modifier (M1) used to modify the epoxy resin (E1) is a functionally-terminated diene-containing polymer having the general formula:

wherein: B is a polymer backbone polymerized from monomers selected from: $C_4$-$C_{10}$ dienes; $C_4$-$C_{10}$ dienes and at least one vinyl aromatic monomer, such as styrene, $C_1$-$C_6$ alkyl-substituted styrene, or halogen-substituted styrene; $C_4$-$C_{10}$ dienes and at least one vinyl nitrile monomer, such as acrylonitrile or methacrylonitrile; $C_4$-$C_{10}$ dienes, at least one vinyl nitrile monomer and at least one vinyl aromatic monomer; or, $C_4$-$C_{10}$ dienes, at least one vinyl nitrile monomer and an acrylate of the formula $CH_2$=CR—COOR$^1$ wherein R and R$^1$ are independently of one another selected from hydrogen or $C_1$-$C_{10}$ alkyl groups; and, X can be any functional group that can react with an oxirane group, of which suitable examples include carboxy, amino, hydroxyl, epoxy, mercaptan, anhydride and isocyanate groups.

As the reactant modifier (M1), the functionally-terminated diene-containing polymer should typically be characterized by a functionality of from 1.1 to 2.5, for example from 1.5 to 2.5 or from 1.6 to 2.4. That aside, it is not precluded that the backbone (X) of the polymer be partially hydrogenated.

By way of non-limiting example, the functionally-terminated diene-containing polymer (M1) may be selected from: carboxyl-terminated polybutadiene; carboxyl-terminated poly(butadiene-acrylonitrile); and, carboxyl-terminated poly(butadiene-acrylonitrile-acrylic acid).

A preference as modifier (M1) for carboxyl-terminated poly(butadiene-acrylonitrile) (CTBN) may be noted and in particular for carboxyl-terminated poly(butadiene-acrylonitrile) (CTBN) constituted by: from 5 to 30 wt. % acrylonitrile; and, from 70 to 95 wt. % butadiene. Independently or additionally to this constitution, the carboxyl-terminated poly(butadiene-acrylonitrile) (CTBN) should have a number average molecular weight (Mn) of from 1000 to 50000 g/mol, for example from 2000 to 10000 g/mol. Further, the carboxyl-terminated poly(butadiene-acrylonitrile) is not precluded from including other functional groups—such as amino, phenolic, hydroxyl, epoxy, mercaptan or anhydride groups—pendent on the chain, in addition to the terminal carboxyl groups.

Aside from functionally-terminated diene-containing polymers, the use of diene-containing polymers functionalized non-terminally along the chain skeleton may be useful in some embodiments. Such functionalized polymers (M1) might include, by way of example: carboxylated polybutadiene; carboxylated poly(butadiene-styrene); mid-block carboxylated poly(styrene-ethylene/butadiene-styrene); amidated poly(butadiene-styrene); mercapto-polybutadiene; epoxidized polybutadiene; and, epoxidized poly(butadiene-styrene).

In a further embodiment of the present invention, the composition is characterized in that said at least one elastomer functionalized epoxy resin either comprises or consists of at least one urethane modified epoxy resin. In this embodiment, the functionalized modifier (M1) which modifies the epoxy resin (E1) is an isocyanate group-terminated, urethane pre-polymer obtainable by reacting a polyisocyanate compound (1) and a polyhydroxyl (P) compound.

Without intention to limit this embodiment, the urethane pre-polymer (M1) should be characterized by: i) an NCO content of from 5 to 30%, preferably from 10 to 25% by weight, based on the prepolymer; and, ii) a functionality of 1.1 to 2.5. These characterizing properties may be found in known commercially available pre-polymers. Alternatively, components (1) and (P) may be reacted in a ratio and under conditions such that these properties of the resultant pre-polymer are achieved.

The polyisocyanates (1) used in preparing the pre-polymer (M1) include any aliphatic, cycloaliphatic, arylaliphatic, heterocyclic or aromatic polyisocyanate, or mixture thereof, having an average isocyanate functionality of at least 2.0 and an equivalent weight of at least 80. The isocyanate functionality of the polyisocyanate (1) will more generally be from 2.2 to 4.0, for example 2.3 to 3.5. Whilst functionalities greater than 4.0 may be used, their use can cause excessive crosslinking. The equivalent weight of the polyisocyanate is typically from 100 to 300, preferably from 110 to 250, and more preferably from 120 to 200.

The polyisocyanates, where required, may have been biuretized and/or isocyanurated by generally known methods, such as described in UK Patent No. 889,050.

Examples of suitable polyisocyanates (1) include but are not limited to: ethylene diisocyanate; 1,4-tetramethylene diisocyanate; hexamethylene diisocyanate (HDI); biuret or trimers of HDI; 1,12-dodecane diisocyanate, cyclobutane-1,3-diisocyanate cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers; hexahydrol, 3- and/or 1,4-phenylene diisocyanate; perhydro-2,5'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate (MDI); naphthylene-1,5-diisocyanate; triphenyl methane-4,4',4'-tri-isocyanate; and, polyphenyl polymethylene polyisocyanates of the type obtained by condensing aniline with formaldehyde, followed by phosgenation such as described in UK Patent Nos. 874,430 and 848,671. It is noted that di- and/or polyisocyanates comprising ester, urea, allophanate, carbodiimide, uretdione and/or urethane groups may also be used in the process according to the invention.

The polyhydroxyl compound (P) used to derive the urethane pre-polymer (M1) should conventionally have a number average molecular weight (Mn) of from 400 to 10000 g/mol. The hydroxyl number of the polyhydroxy compound (P) should conventionally be from 20 to 850 mg KOH/g and preferably from 25 to 500 mg KOH/g. Further, it is desirable that the polyhydroxy compound (P) be selected from divalent or polyvalent: polyether polyols; polyester polyols; poly(ether-ester) polyols; poly(alkylene carbonate) polyols; hydroxyl-containing polythioethers; polymer polyols; and, mixtures thereof.

Whilst diols and triols of low molecular weights, for instance from 60 to 400 or 300 g/mol., may be reactive towards isocyanates (1), these polyols are typically only used as starter molecules, chain extenders and/or crosslinking agents in a reaction mixture which contains the one or more active hydrogen compounds (P). In this regard, mention may be made: aliphatic, cycloaliphatic and/or araliphatic diols having from 2 to 14 and preferably from 4 to 10 carbon atoms, such as ethylene glycol, 1,3-propanediol, 1,4-butanediol, 1,6-hexanediol, 1,10-decanediol, o-, m- and p-dihydroxycyclohexane; diethylene glycol; dipropylene glycol; bis(2-hydroxyethyl)hydroquinone; and, triols, such as 1,2,4-, and 1,3,5-trihydroxycyclohexane, glycerol and trimethylolpropane.

Polyether polyols are well-known in the art and include polyoxyethylene, polyoxypropylene, polyoxybutylene and polytetramethylene ether diols and triols. The polyether polyols may generally have weight average molecular weights (Mw) of from 400 to 10000 g/mol, for example from 1000 to 7000 g/mol, and be prepared by polymerizing alkylene oxides in the presence of an active hydrogen-containing initiator compound, as described in U.S. Pat. Nos. 4,269,9945, 4,218,543 and 4,374,210 for instance. The alkylene oxide monomers are typically selected from the group consisting of: ethylene oxide; propylene oxide; butylene oxides; styrene oxide; epichlorohydrin; epibromohydrin; and, mixtures thereof. The active hydrogen initiators are in turn typically selected from the group consisting of: water; ethylene glycol; propylene glycol; butanediol; hexanediol; glycerin; trimethylol propane; pentaerythritol; hexanetriol; sorbitol; sucrose; hydroquinone; resorcinol; catechol; bisphenols; novolac resins; phosphoric acid; amines; and mixtures thereof.

As is known in the art, polyester polyols may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of polyhydric alcohols which are useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof. As regards the present invention, useful polyester polyols will typically have weight average molecular weights (Mw) of from 1000 to 10000 g/mol.

In an embodiment of the present invention, the reactant polyhydroxyl compound(s) (P) have an average functionality of at least 1.5, preferably at least 1.8 and more preferably at least 2.0, but no greater than 4.0, preferably no greater than about 3.5 and more preferably no greater than 3.0. Independently or additionally, the equivalent weight of the reactant polyhydroxyl compound(s) (P) is at least 200 g/eq., preferably at least 500 g/eq. and more preferably at least 1,000 g/eq. but no greater than 3500 g/eq., preferably no greater than 3000 g/eq. and more preferably no greater than 2500 g/eq.

Starting from components (P) and (I) as defined above, the polyurethane pre-polymer (M1) may be prepared under anhydrous conditions by any suitable method, such as bulk polymerization and solution polymerization. The polyhydroxyl compound(s) (P) are present therein an amount sufficient to react with most of the isocyanate groups but leaving enough isocyanate groups to correspond with the desired free isocyanate content of the urethane pre-polymer (M1). And in that embodiment where the polyhydroxyl compound(s) (P) comprise a mixture of diols and triols, the proportion of diol to triol must be chosen to achieve the desired isocyanate functionality of the urethane prepolymer (M1).

In a further and a preferred embodiment of the present invention, the composition is characterized in that said at least one elastomer functionalized epoxy resin b) either comprises or consists of at least one dimer acid-modified epoxy resin. The dimer acid modifier (M1) may be cyclic or non-cyclic but will conventionally be a C36 to C44 aliphatic diacid which may be prepared by the oxidative coupling of C18 to C22 unsaturated monoacids. Dimer acids obtained from the oxidative coupling of oleic acid, linoleic acid or talloil fatty acid may be mentioned as exemplary dimer acid modifiers (M1).

Having regard to the preferred embodiments discussed herein above, commercial examples of suitable elastomer modified epoxy resins include: Hypox® resins, including Hypox DA 323, available from CVC Thermosets; EPON 58005 and EPON 58034 available from Miller-Stephenson; JER871 and JER872, available from Mitsubishi Chemical Corporation; B-Tough A1, A2 and A3 available from available from Croda Coatings and Polymers; YD-171 and YD-172, available from Nippon Steel Chemical Co., Ltd.; and, EPU-6, EPU-7N, EPU-11F, EPU-15F, EPU-1395, EPU-738, EPU-17, EPU-17T-6 and EPU-80 available from Adeka Corporation.

c) Core-Shell Rubber Particles

The present composition is defined as comprising, based on the weight of the composition, from 1 to 40 wt. %, preferably from 1 to 35 wt. % and more preferably from 5 to 30 wt. % of c) core-shell rubber particles.

The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower.

The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth)acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that the core-shell rubber particles have an average particle size (d50) of from 10 nm to 300 nm, for example from 50 nm to 200 nm: said particle size refers to the diameter or largest dimension of a particle in a distribution of particles and is measured via dynamic light scattering.

The present application does not preclude the presence of two types of core shell rubber (CSR) particles with different particle sizes in the composition to provide a balance of key properties of the resultant cured product, including shear strength, peel strength and resin fracture toughness. In this embodiment, smaller included particles ($1^{st}$ CSR type) may have an average particle size of from 10 to 100 nm and larger included particles ($2^{nd}$ CSR type) may have an average particle size of from 120 nm to 300 nm, for example from 150 to 300 nm. The smaller core shell rubber particles should typically be employed in excess of the larger particles on a weight basis: a weight ratio of smaller CSR particles to larger CSR particles of from 3:1 to 5:1 may be employed for instance.

The core-shell rubber may be selected from commercially available products, examples of which include: the Zefiac series available from Aica Kogyo Co. Ltd; Paraloid EXL 2650A, EXL 2655 and EXL2691 A, available from The Dow Chemical Company; the Kane Ace® MX series available from Kaneka Corporation, and in particular MX 120, MX 125, MX 130, MX 136, MX 551, MX553; and, METABLEN SX-006 available from Mitsubishi Rayon.

d) Curative

The curative d) necessarily consists of at least one compound possessing at least two epoxide reactive groups per molecule. In the present invention, the curative d) is characterized by comprising dicyandiamide. And it is preferred that said dicyandiamide is employed in finely divided form: an average particle size (d50) of from 0.5 to 100 µm, for example from 1 to 50 µm or from 2 to 20 µm might be noted as desirable. Said particle size refers to the diameter or largest dimension of a particle in a distribution of particles and is measureable via dynamic light scattering.

Whilst it is preferred that the curative d) consists of or consists essentially of dicyandiamide, the presence of other curing agents in an amount up to 20 mol. %, based on the total moles of said dicyandiamide is not precluded by the present invention. Any selected supplementary curative d) to the dicyandiamide should not deleteriously impact the pot life of the one component (1K) composition.

When formulating the curable composition, it is preferred that the composition in toto be characterized by a molar ratio of epoxide-reactive groups to epoxide groups from 0.95:1 to 1.5:1, for example from 0.95:1 to 1.1:1. Notably, the molar ratio of epoxide-reactive groups to epoxide groups of 1:1 is included within these stated ranges and itself represents a highly preferred molar ratio.

e) Urea Derivatives as Accelerators

In accordance with an interesting embodiment of the accelerator e) of the present invention, the composition comprises at least one urea derivative of Formula (V) or Formula (VI):

Formula (V)

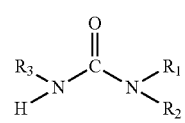

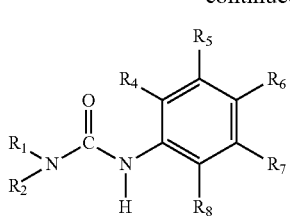

Formula (VI)

wherein: at least one residue $R^1$, $R^2$, $R^3$ is not hydrogen;
$R^1$ and $R^2$ are independently selected from hydrogen, $C_1$-$C_{18}$ alkyl and $C_3$-$C_{18}$ cycloalkyl;
$R^3$ is hydrogen, $C_1$-$C_{18}$ alkyl, $C_3$-$C_{18}$ cycloalkyl, $C_6$-$C_{18}$ aryl, $C_6$-$C_{18}$ aralkyl, $C_6$-$C_{18}$-alkylaryl, $C_1$-$C_{18}$ alkyl substituted with —NHC(O)NR$^1$R$^2$, $C_3$-$C_{18}$ cycloalkyl substituted with —NHC(O)NR$^1$R$^2$, $C_6$-$C_{18}$ aryl substituted with —NHC(O)NR$^1$R$^2$; $C_6$-$C_{18}$ aralkyl substituted with —NHC(O)NR$^1$R$^2$; and, $C_6$-$C_{18}$ aralkyl substituted with —NHC(O)NR$^1$R$^2$; and,
$R^4$, $R^5$, $R^6$, $R^7$ and $R^8$ are independently selected from hydrogen, halogen, $C_1$-$C_{18}$ alkyl, $C_3$ to $C_{18}$ cycloalkyl, $C_6$-$C_{18}$ aryl, $C_6$-$C_{18}$ aralkyl, $C_6$-$C_{18}$-alkylaryl, —CF$_3$, —NHC(O)NR$^1$R$^2$, $C_1$-$C_{18}$ alkyl substituted with —NHC(O)NR$^1$R$^2$, $C_3$-$C_{18}$ cycloalkyl substituted with —NHC(O)NR$^1$R$^2$, $C_6$-$C_{18}$ aryl substituted with —NHC(O)NR$^1$R$^2$; $C_6$-$C_{18}$ aralkyl substituted with —NHC(O)NR$^1$R$^2$; and, $C_6$-$C_{18}$ aralkyl substituted with —NHC(O)NR$^1$R$^2$.

The substituents ($R^1$-$R^8$) of the urea derivative of Formulae (V) and (VI) should be selected to ensure any said derivative(s) is liquid at room temperature and 1 atmosphere pressure and has a viscosity of less than 1 Pa·s, preferably less than 100 mPa·s at 25° C. Additional to those considerations, it is preferred that the urea derivatives of Formulae (V) and (VI) meet the following conditions:
at least one residue $R^1$, $R^2$, $R^3$ is not hydrogen;
$R^1$ and $R^2$ are independently selected from hydrogen and $C_1$-$C_4$ alkyl; and,
$R^4$, $R^5$, $R^6$, $R^7$ and $R^8$ are independently selected from hydrogen, halogen, $C_1$-$C_4$ alkyl and —NHC(O)NR$^1$R$^2$.

A particular preference for the use of N,N-diethylurea, N,N-dipropylurea, N,N-ethyl-methylurea, N,N-dimethylurea, 1,1'-(4-methyl-m-phenylene)-bis-(3,3-dimethylurea) and 1,1'-(2-methyl-m-phenylene)-bis-(3,3-dimethylurea) may be noted.

When said ureas are employed as accelerators, it is essential that the molar ratio of dicyandiamide to the total of said urea derivatives is ≥1 and is preferably in the range from 1:1 to 4:1, for example from 1:1 to 3:1.

f) Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are catalysts, plasticizers, coupling agents, adhesion promoters, stabilizers including UV stabilizers, antioxidants, secondary tougheners, fillers, reactive diluents, drying agents, fungicides, flame retardants, rheological adjuvants, color pigments or color pastes, and/or optionally also, to a small extent, non-reactive diluents.

Suitable catalysts are substances that promote the reaction between the epoxide groups and the epoxide-reactive groups, for instance the reaction between the amine groups and the epoxide groups. A specific example relates to the use of an amine catalyst which functions by de-protonation of reactive thiol (—SH) groups present to thiolate (—S"), which thiolate reacts with epoxide groups by nucleophilic ring opening polymerization.

Without intention to the limit the catalysts used in the present invention, mention may be made of the following suitable catalysts: i) acids or compounds hydrolyzable to acids, in particular a) organic carboxylic acids, such as acetic acid, benzoic acid, salicylic acid, 2-nitrobenzoic acid and lactic acid; b) organic sulfonic acids, such as methanesulfonic acid, p-toluenesulfonic acid and 4-dodecylbenzenesulfonic acid; c) sulfonic acid esters; d) inorganic acids, such as phosphoric acid; e) Lewis acid compounds, such as BF$_3$ amine complexes, SbF$_6$ sulfonium compounds, bis-arene iron complexes; f) Bronsted acid compounds, such as pentafluoroantimonic acid complexes; and, e) mixtures of the aforementioned acids and acid esters; ii) tertiary amines, such as 1,4-diazabicyclo[2.2.2]octane, benzyldimethylamine, α-methylbenzyl dimethylamine, triethanolamine, dimethylamino propylamine, imidazoles—including N-methylimidazole, N-vinylimidazole and 1,2-dimethylimidazole—and salts of such tertiary amines; iii) quaternary ammonium salts, such as benzyltrimethyl ammonium chloride; iv) amidines, such as 1,8-diazabicyclo[5.4.0]undec-7-ene; v) guanidines, such as 1,1,3,3-tetramethylguanidine; vi) phenols, in particular bisphenols; vii) phenol resins; viii) Mannich bases; and, ix) phosphites, such as di- and triphenylphosphites.

In an embodiment, an amine catalyst for the curing a composition based on the epoxy resin may be photobase generator: upon exposure to UV radiation—typically in the wavelength from 320 to 420 nm—said photobase generator releases an amine, which catalyzes the addition of the epoxide reactive groups to the epoxide. The photobase generator is not specifically limited so long as it generates an amine directly or indirectly with light irradiation. However, suitable photobase generators which may be mentioned include: benzyl carbamates; benzoin carbamates; o-carbamoylhydroxyamines; O-carbamoyloximes; aromatic sulfonamides; alpha-lactams; N-(2-allylethenyl)amides; arylazide compounds, N-arylformamides, and 4-(ortho-nitrophenyl) dihydropyridines.

For completeness, the preparation of photobase generator compounds is known in the art and instructive references include: J. Cameron et al., J. Am. Chem. Soc, Vol. 113, No. 11, 4303-4313 (1991); J. Cameron et al., J. Polym. Mater. Sci. Eng., 64, 55 (1991); J. Cameron, et al., J. Org. Chem., 55, 5919-5922 (1990); and, U.S. Pat. No. 5,650,261 (Winkel). Moreover, photobase generators are further described in: M. Shirai et al. *Photochemical Reactions of Quaternary Ammonium Dithiocarbamates as Photobase Generators and Their Use in The Photoinitiated Thermal Crosslinking of Poly(gycidylmethacrylate)*, Journal of Polymer Science, Part A: Polymer Chemistry, Vol. 39, pp. 1329-1341 (2001); and, M. Shirai et al., *Photoacid and photobase generators: chemistry and applications to polymeric materials*, Progress in Polymer Science, Vol. 21, pp. 1-45, XP-002299394, 1996.

In an alternative embodiment, an acid catalyst may be selected from photoacid generators (PAGs): upon irradiation with light energy, ionic photoacid generators undergo a fragmentation reaction and release one or more molecules of Lewis or Bronsted acid that catalyze the ring opening and addition of the pendent epoxide groups to form a crosslink. Useful photoacid generators are thermally stable, do not undergo thermally induced reactions with the forming copolymer and are readily dissolved or dispersed in the curable compositions. Photoacid generators are known in the art and instructive reference may be made to: K. Dietliker, *Chemistry and Technology of UV and EB Formulation for Coatings, Inks and Paints*, Vol. III, SITA Technology Ltd., London (1991); and, Kirk-Othmer *Encyclopedia of Chemical Technology*, 4.Sup.Th Edition, Supplement Volume, John Wiley and Sons, New York, pp 253-255.

Exemplary cations which may be used as the cationic portion of the ionic PAG of the invention include organic onium cations such as those described in U.S. Pat. Nos. 4,250,311, 3,113,708, 4,069,055, 4,216,288, 5,084,586, 5,124,417, and, U.S. Pat. No. 5,554,664. The references specifically encompass aliphatic or aromatic Group IVA and VIIA (CAS version) centered onium salts, with a preference being noted for I-, S-, P-, Se- N- and C-centered onium salts, such as those selected from sulfoxonium, iodonium, sulfonium, selenonium, pyridinium, carbonium and phosphonium.

As is known in the art, the nature of the counter-anion in the ionic photoacid generator (PAG) can influence the rate and extent of cationic addition polymerization of the epoxide groups. For illustration, Crivello et al. Chem. Mater., 4, 692, (1992) reports that the order of reactivity among commonly used nucleophilic anions is $SbF_6^->AsF_6^->PF_6^->BF_4^-$. The influence of the anion on reactivity has been ascribed to three principle factors which the skilled artisan should compensate for in the present invention: (1) the acidity of the protonic or Lewis acid generated; (2) the degree of ion-pair separation in the propagating cationic chain; and, (3) the susceptibility of the anions to fluoride abstraction and consequent chain termination.

It is not precluded that the compositions of the present invention include alternative photoinitiator compounds to the photobase generator and photoacid generator compounds mentioned herein above, which photoinitiator compound(s) would initiate the polymerization or hardening of the compositions upon irradiation with actinic radiation. It is noted that photo-polymerizable compositions of the present invention can be cationically polymerizable or free-radically polymerizable: whilst epoxy groups are cationically active, the election of a free-radical polymerization mechanism imposes the requirement that the composition must contain a compound possessing a free-radically active, unsaturated group such as an acrylate compound, a (meth)acrylate compound, an epoxy-functional acrylate, an epoxy functional (meth)acrylate or a combination thereof. Applying that election, the preferred photoinitiators would be photoactive compounds that undergo a Norrish I cleavage to generate free radicals that can initiate by addition to the acrylic double bonds.

In toto photoinitiators should be present in the photopolymerizable composition in amount of from 0.1 to 1.0 parts by weight based on 100 parts of the reactant compounds.

The use of a photoinitiator—and also the photobase generator and photoacid generators mentioned herein above—may produce residue compounds from the photochemical reaction. The residues may be detected by conventional analytical techniques such as: infrared, ultraviolet and NMR spectroscopy; gas or liquid chromatography; and, mass spectroscopy. Thus, the present invention may comprise cured (epoxy) matrix copolymers and detectable amounts of residues from a photobase/acid generator. Such residues are present in small amounts and do not normally interfere with the desired physiochemical properties of the product.

Without intention to limit the present invention, a mixture comprising one or more photoinitiators may be irradiated with activating radiation to polymerize the monomeric component(s). The purpose of the irradiation is to generate the active species from the photoinitiator which initiates the cure reactions. Once that species is generated, the cure chemistry is subject to the same rules of thermodynamics as any chemical reaction: the reaction rate may be accelerated by heat. The practice of using thermal treatments to enhance the cationic UV cure of monomers is generally known in the art, with an illustrative instructive reference being Crivello et al., "*Dual Photo—and thermally initiated cationic polymerization of epoxy monomers*," Journal of Polymer Science A, Polymer Chemistry., Vol. 44, Issue: 23, pp. 6750-6764, (Dec. 1, 2006).

As would be recognized by the skilled artisan, photosensitizers can be incorporated into the compositions to improve the efficiency with which any photoinitiators present use the energy delivered. Photosensitizers are typically used in an amount of from 5 to 25 wt. %, based on the weight of the photoinitiator.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

In certain embodiments, the composition includes up to 5 wt. %, based on the weight of the composition, of at least one epoxy silane coupling agent which can serve to enhance the adhesion of the curing composition to a given surface. The hydrolyzable groups of the coupling agent can react with the surface to remove unwanted hydroxyl groups; the epoxy groups thereof react with the film-forming polymer to chemically link said polymer with the surface. Preferably, the coupling agents possess from 1 to 3 hydrolyzable functional groups and at least one epoxy group.

Examples of suitable epoxy silane coupling agents include but are not limited to: glycidoxy polymethylenetrialkoxysilanes, such as 3-glycidoxy-1-propyltrimethoxysilane; (meth)acryloxypolymethylenetrialkoysilanes, such as 3-methacrylyloxy-1-propyltrimethoxysilane; γ-methacryloxypropyltrimethoxysilane (A-174 available from GE Silicones); γ-glycidoxypropyltrimethoxysilane (A-187 available from Momentive Performance Materials, Inc.); α-glycidoxypropylmethyldiethoxysilane (A-2287 available from Momentive Performance Materials, Inc.); vinyl-tris-(2-methoxyethoxy)silane (A-172 from available Momentive Performance Materials, Inc.); and, α-chloropropyltrimethoxysilane (KBM-703 available from Shin-Etsu Chemical Co., Ltd.).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

As noted, the compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 µm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 0 to 60 wt. %, and more preferably from 0 to 30 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

Having regard to component c) hereinabove, it is noted that other compounds having metal chelating properties may also be used in the compositions of the present invention to help enhance the adhesion of the cured adhesive to a substrate surface. Further, also suitable for use as adhesion promoters are the acetoacetate-functionalized modifying resins sold by King Industries under the trade name K-FLEX XM-B301.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 to 5 wt. %, based on the total weight of the composition.

The presence of non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute less than 10 wt. %, in particular less than 5 wt. % or less than 2 wt. %, based on the total weight of the composition.

For completeness, the compositions of the present invention may comprise one or more monoamines, such as hexylamine and benzylamine.

Illustrative Embodiment of the One Component (1K) Composition

In an exemplary embodiment of the present invention, the one component (1K) composition comprises, based on the weight of the composition:
from 40 to 60 wt. % of a) at least one epoxy resin;
from 10 to 25 wt. % of b) at least one internally flexibilized epoxy resin which is characterized by a Shore D hardness, as measured with a durometer in accordance with ASTM D2240, of ≤45 when cured with diethylene triamine;
at least one chelate modified epoxy resin, said resin(s) being present in a total amount up to 5 wt. %;
at least one from elastomer modified epoxy resin, said resin(s) being present in a total amount up to 5 wt. %;
from 5 to 30 wt. % of c) core shell rubber particles;
d) a curative which consists of at least one compound possessing at least two epoxide reactive groups per molecule, said curative consisting of dicyandiamide, wherein said dicyandiamide has a particulate form characterized by an average particle size (d50) of from 1 to 50 µm, preferably from 2 to 20 µm; and, e) at least one urea derivative selected from the group consisting of N,N-diethylurea, N,N-dipropylurea, N,N-ethyl-methylurea, N,N-dimethylurea, 1,1'-(4-methyl-m-phenylene)-bis-(3,3-dimethylurea) and 1,1'-(2-methyl-m-phenylene)-bis-(3,3-dimethylurea);

wherein said composition is characterized in that the molar ratio of epoxide reactive groups provided in said curative d) to epoxide groups is from 0.95:1 to 1.5:1, preferably from 0.95:1 to 1.1:1; and, wherein the molar ratio of dicyandiamide to the total of said urea derivatives is in the range from 1:1 to 4:1, preferably from 1:1 to 3:1.

This exemplary embodiment of the composition has been demonstrated to form—when cured—an effective bonding agent for metallic materials, including shaped and jointed metallic components and including where the bonded metallic materials are different from one another.

Methods and Applications

To form a composition, the above described parts are brought together and mixed. As is known in the art, to form one component (1K) curable compositions, the elements of the composition are brought together and homogeneously mixed under conditions which inhibit or prevent the reactive components from reacting: as would be readily comprehended by the skilled artisan, this might include mixing conditions which limit or prevent exposure to moisture or irradiation or which limit or prevent the activation of a constituent latent catalyst. As such, it will often be preferred that the curative elements are not mixed by hand but are instead mixed by machine—a static or dynamic mixer, for example—in pre-determined amounts under anhydrous conditions without intentional photo-irradiation.

In accordance with the broadest process aspects of the present invention, the above described compositions are applied to a substrate and then cured in situ. Prior to applying the compositions, it is often advisable to pre-treat the relevant surfaces to remove foreign matter there from: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

In some embodiments, the adhesion of the coating compositions of the present invention to the preferably pre-treated substrate may be facilitated by the application of a primer thereto. Whilst the skilled artisan will be able to select an appropriate primer, instructive references for the choice of primer include but are not limited to: U.S. Pat. Nos. 3,671,483; 4,681,636; 4,749,741; 4,147,685; and, U.S. Pat. No. 6,231,990.

The compositions are then applied to the preferably pre-treated, optionally primed surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 µm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

The curing of the compositions of the invention can occur at temperatures in the range of from 100° C. to 200° C., preferably from 100° C. to 170° C., and in particular from 120° C. to 160° C. The temperature that is suitable depends on the specific compounds present and the desired curing rate and can be determined in the individual case by the skilled artisan, using simple preliminary tests if necessary. Where applicable, however, the temperature of the mixture formed from the respective components of the composition may be raised above the mixing temperature and/or the application temperature using conventional means including microwave induction.

For completeness, it is noted that the present invention does not preclude the preparation of epoxy adhesives in the form of "film adhesive". A pre-polymer mixture of epoxy resins, hardener, and other desired components is applied as a coating onto a polymer film substrate, rolled up and stored at a sufficiently low temperature to inhibit the chemical reactions between the components. When needed, the film adhesive is removed from the low temperature environment and applied to a metal or composite part, the backing is stripped off and the assembly completed and cured in an oven or autoclave.

The curable compositions according to the invention may find utility inter alia in: varnishes; inks; binding agents for fibers and/or particles; the coating of glass; the coating and bonding of mineral building materials, such as lime- and/or cement-bonded plasters, gypsum-containing surfaces, fiber cement building materials and concrete; the coating, sealing or bonding of wood and wooden materials, such as chipboard, fiber board and paper; the coating or bonding of metallic surfaces; the coating of asphalt- and bitumen-containing pavements; the coating, sealing or bonding of various plastic surfaces; and, the coating of leather and textiles.

In a particularly preferred embodiment, the composition of the present invention is applied to structural substrates to produce an adherent, highly abrasion resistant coating or bond. The bonding operation can often be effected at less than 200° C. and effective abrasion resistance can be attained after curing. Moreover, when bonding to the surface of mechanical structures or to a floor or pavement, the coating compositions can provide a strong, reliable bond, provide thermal stability and corrosion protection for the surface and can prevent the surface from being contacted with compounds which would deleterious to the operation or efficiency of the specific structure.

The following examples are illustrative of the present invention and are not intended to limit the scope of the invention in any way.

EXAMPLES

The following compounds and materials are employed in the Examples:

JER™ 828: Bisphenol A, liquid epoxy resin formed by the condensation polymerization of bisphenol A and epichlorohydrin, available from Mitsubishi Chemical.

DER™ 332: Bisphenol A epoxy resin, supplied by Olin Corporation.

KanAce MX 154: Bisphenol A epoxy resin premixed with toughener, available from Kaneka Corporation.

Acryset BPA 328: Bisphenol A epoxy resin premixed with toughener, available from Nippon Shokubai Co. Ltd.

EP-49-10N: Chelate modified epoxy resin having an Epoxide Equivalent Weight of 220, available from Adeka Corporation.

NC-514S: Hydrophobic, flexible difunctional glycidyl ether epoxy resin having an Epoxide Equivalent Weight of 350-500, available from Cardolite.

Silquest A-187: Silane coupling agent available from Momentive Performance Chemicals.

90-EPX-04: Carbon black, available from Harwick Chemical.

Zefiac 351: Core-shell rubber particles available from Aica Kogyo Co. Ltd.

DAW 7: Alumina, available from Denka Corporation.

Aerosil R202: Fumed silica, available from Evonik Corporation.

CG 1200G: Dicyandiamide (cyanoguanidine) available from Evonik Corporation.

Amicure UR2T: Substituted urea-based accelerator [1,1'-(4 methyl-m-phenylene)bis(3,3 dimethyl urea)] available from Evonik Corporation.

The ingredients were combined in the percentages given in Table 1 herein below.

TABLE 1

| Ingredient | Example 1 | Example 2 |
|---|---|---|
| JER828 | 19 | |
| DER332 | | 19 |
| KanAce MX154 | 25 | |
| Acryset BPA 328 | | 25 |
| NC 514S | 20 | 20 |
| EP-49-10N | 2 | 2 |
| Silquest A-187 | 0.4 | 0.4 |
| 90-EPX-04 | 0.6 | 0.6 |
| Zefiac F351 | 15 | 15 |
| DAW 7 | 8 | 8 |
| Aerosil R202 | 2 | 2 |
| CG 1200G | 5 | 5 |
| UR 2T | 3 | 3 |

Viscosity and lap shear strength measurements were obtained in accordance with the aforementioned protocols and the results thereof are recorded in Table 2 herein below. A further test was performed as follows.

Differential Scanning Calorimetry (DSC) Cure Test: Samples of Example 1 were selected and tested by DSC isothermal method. More specifically, a 10.0 mg sample of the composition was individually weighed out on a milligram balance, enclosed in a hermetically sealed aluminum DSC pan, and loaded into a Perkin Elmer Diamond DSC analyzer together with an identical empty pan to be used as a reference. The heat generation was measured for 60 minutes with setting temperature at 140° C. Cure behavior was analyzed from the resulting thermographs and the cure time at 95% conversion rate at 140° C. curing was determined and recorded in Table 2 herein below.

| Tested Condition | Example 1 | Example 2 |
|---|---|---|
| Viscosity (mPa · s) | 188600 | 125000 |
| Thixotropic Index | 2.1 | 2.8 |
| Lap Shear Strength (MPa) | 29.7 | 29.5 |
| DSC Cure Behaviour: Cure time at 95% conversion rate at 140° C. (minutes) | 11.6 | 12.0 |

In view of the foregoing description and examples, it will be apparent to those skilled in the art that equivalent modifications thereof can be made without departing from the scope of the claims.

What is claimed is:

1. A curable composition comprising, based on the total weight of the composition:
   a) at least one epoxy resin present in an amount of from about 30 to about 50 wt %;
   b) at least one internally flexibilized epoxy resin having a Shore D hardness, as measured with a durometer in accordance with ASTM D2240, of less than or equal to 45 when cured with diethylene triamine, the at least one internally flexibilized epoxy resin being present in an amount of from about 15 to about 25 wt %;
   c) core shell rubber particles present in an amount of from about 10 to about 20 wt %;
   d) at least one curative comprising at least one compound having at least two epoxide reactive groups per molecule, the at least one curative being present in an amount of from about 1 to about 5 wt %;
   e) at least one accelerator, the at least one accelerator being a urea derivative selected from the group consisting of N,N-diethylurea, N,N-dipropylurea, N,N-ethylmethylurea, N,N-dimethylurea, 1-1'-(4-methyl-m-phenylene)-bis-(3,3-dimethylurea) and 1,1'-(2-methyl-m-phenylene)-bis-(3,3-dimethylurea), the at least one accelerator present in an amount of from about 1 to about 5 wt %; and
   f) at least one chelate modified epoxy resin present in an amount of from about 1 to about 5 wt %,
   wherein the lap shear strength of the composition when cured is at least 20 MPa.

2. The composition of claim 1, wherein the at least one epoxy resin is selected from the group consisting of glycidyl ethers of polyhydric alcohols and polyhydric phenols, glycidyl esters of polycarboxylic acids, and epoxidized polyethylenically unsaturated hydrocarbons, esters, ethers, and amides.

3. The composition of claim 1, wherein the at least one internally flexibilized epoxy resin has an epoxide equivalent weight of from 200 to 600 g/eq.

4. The composition of claim 1, wherein the at least one internally flexibilized epoxy resin has a Shore D hardness, as measured with a durometer in accordance with ASTM D2240, of less than or equal to 40 when cured with diethylene triamine.

5. The composition of claim 1, further comprising an internally flexibilized epoxy resin having the general formula (III):

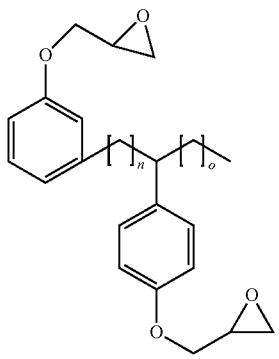

(III)

wherein n and o are independently selected as an integer from 1 to 10.

6. The composition of claim 1, wherein the at least one curative is dicyandiamide.

7. The composition of claim 6, wherein the dicyandiamide is in a particulate form and has an average particle size of from 0.5 to 100 μm.

8. The composition of claim 6, wherein the molar ratio of dicyandiamide to the at least one accelerator is of from about 1:1 to about 4:1.

9. The composition of claim 1, further comprising at least one elastomer modified epoxy resin.

10. A product obtained from curing the composition of claim 1.

11. The composition of claim 1, wherein the at least one chelate modified epoxy resin has an Epoxide Equivalent Weight of 220.

12. The composition of claim 1, wherein the at least one chelate modified epoxy resin has a chelating functional group selected from the group consisting of phosphorus-containing acid groups, carboxylic acid groups, sulfur-containing acid groups, and hydroxyl groups.

13. The composition of claim 1, wherein the lap shear strength of the composition is at least 25 MPa.

14. The composition of claim 1, wherein the composition further comprises an epoxy silane coupling agent.

15. The composition of claim 14, wherein the epoxy silane coupling agent is present in an amount of from about 0.1 to about 5 wt % of the composition, based on the total weight of the composition.

16. A curable composition comprising, based on the total weight of the composition:
 a) at least one epoxy resin present in an amount of from about 30 to about 50 wt %;
 b) glycidyl ether epoxy resin present in an amount of from about 15 to about 25 wt %;
 c) core shell rubber particles present in an amount of from about 10 to about 20 wt %;
 d) dicyandiamide present in an amount of from about 1 to about 5 wt %;
 e) a urea derivative selected from the group consisting of N,N-diethylurea, N,N-dipropylurea, N,N-ethylmethylurea, N,N-dimethylurea, 1-1'-(4-methyl-m-phenylene)-bis-(3,3-dimethylurea) and 1,1'-(2-methyl-m-phenylene)-bis-(3,3-dimethylurea), the urea derivative being present in an amount of from about 1 to about 5 wt %; and
 f) at least one chelate modified epoxy resin present in an amount of from about 1 to about 5 wt %,
 wherein the molar ratio of epoxide reactive groups provided in the dicyandiamide to the total epoxide groups in the composition is from 0.95:1 to 1.5:1, and
 wherein the molar ratio of dicyandiamide to the urea derivative in the composition is from 1:1 to 4:1.

* * * * *